Sept. 25, 1973   W. P. SIEGMUND   3,761,234
METHOD OF MAKING FIBER OPTICAL MULTIFIBERS AND
DEVICES FORMED THEREOF
Original Filed Jan. 2, 1968   2 Sheets-Sheet 1

SUBSTITUTE FOR MISSING XR

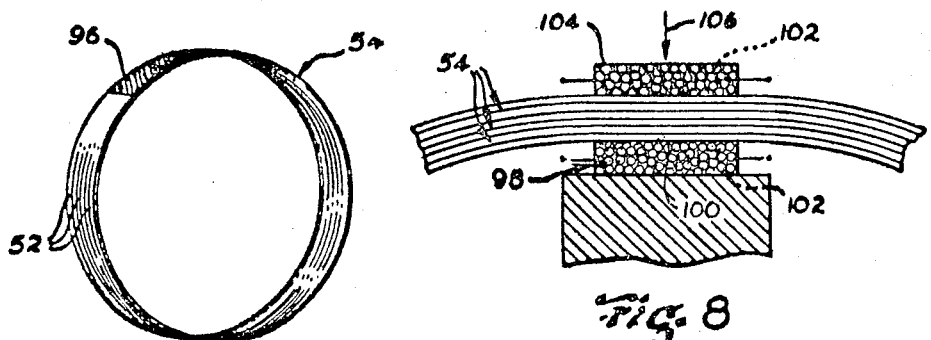
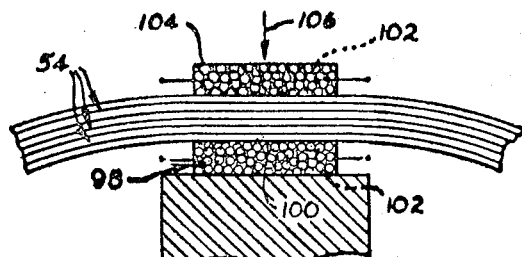
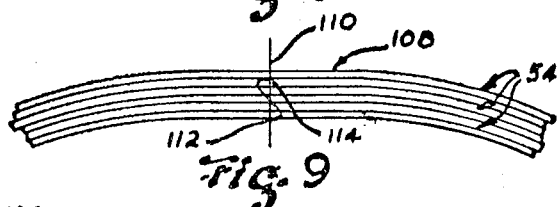
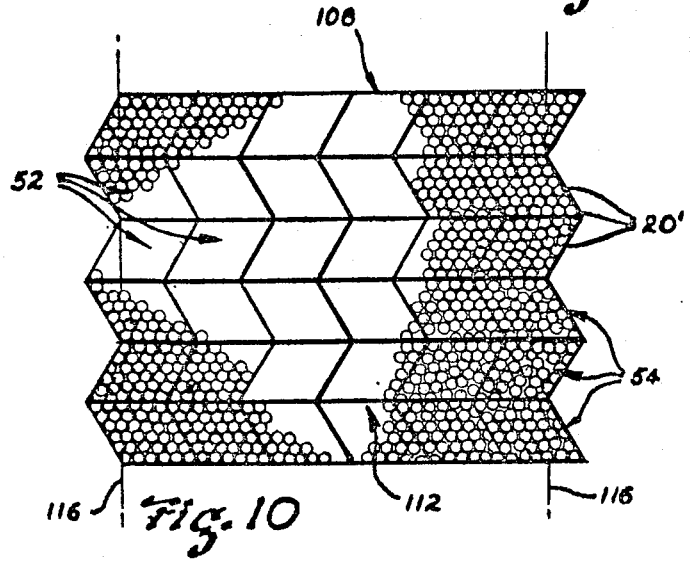

United States Patent Office 3,761,234
Patented Sept. 25, 1973

3,761,234
METHOD OF MAKING FIBER OPTICAL MULTI-FIBERS AND DEVICES FORMED THEREOF
Walter P. Siegmund, Woodstock, Conn., assignor to American Optical Corporation, Southbridge, Mass.
Original application Jan. 2, 1968, Ser. No. 694,609, now Patent No. 3,524,636. Divided and this application Apr. 27, 1970, Ser. No. 43,265
Int. Cl. C03b 5/26; C03c 23/20
U.S. Cl. 65—4                3 Claims

ABSTRACT OF THE DISCLOSURE

A long and relatively thin fiber optical multifier structure is formed to a rhomboidal cros-sectional shape so as to achieve maximum packing density of convolutions of a similarly shaped fiber drawn from the structure and machine wound on a drum to form a ribbon of several fiber widths for use in the construction of fiber optical image-conducting fiberscopes and the like. The fiber is helically wound with one flat side thereof against the drum using a lead no greater than that of the width of said one flat side and moving parallel to the drum in the general direction of slope, toward the drum, of adjacent sides of the fiber. It is also contemplated that the winding lead be slightly less than said width of the fiber to assure maximum packing density.

This application is a division of Ser. No. 694,609, filed Jan. 2, 1968, now Pat. No. 3,524,636.

BACKGROUND OF THE INVENTION

(1) Field of the invention

Fiber optics with particular reference to a novel form of multifiber, its use and function in the making of fiber optical devices and method of making the fiber and devices formed thereof.

(2) Description of the prior art

In the field of this invention which relates more particularly to the manufacture of fiberscopes, there is the ever present need for improved product quality and greater facility and economy of manufacture with which the present invention is especially concerned.

Fiberscopes are, as it is well known in the art, image-conducting devices which are usually but not necessarily long, thin and flexible and have image receiving and emitting opposite end faces comprised of mosaically arranged geometrically identically patterned and connected together ends of a great number of juxtapositioned very thin optical fibers. The device thus formed dissects and transmits an image presented upon one of its end faces with each fiber conserving its fractional part of the image due to total internal reflection.

While the term fiberscope may, in some cases, be interpreted to include means such as lenses for forming and viewing images respectively received and emitted at opposite ends of the fiber optical structure just described, the term fiberscope as used herein is intended to include the arrangement of optical fibers only, i.e. without auxiliary attachments.

In the prior art, such fiberscopes are disclosed as being made by drawing a fiber, winding the fiber helically on a drum to form a ribbon thereof, cementing convolutions of the helix together across a transverse strip of the ribbon and removing the ribbon from the drum. After having formed a number of these ribbons, they are stacked with the cemented strips thereof in superimposed relationship, cemented or otherwise connected together and cut transversely substantially centrally through the stack to form opposite image receiving and emitting ends of the resulting fiberscope.

Optical monofilament fibers or multifibers have been used in the aforesaid practice of forming fiberscopes wherein these have been of generally circular, square or of other rectangular cross-sectional shapes.

The term multifiber as used herein is intended to mean an element which is relatively long, thin and flexible but formed of several monofilaments all fused together as a unit.

The use of round or similarly shaped multifibers in the practice of manufacturing fiberscopes as described above is objectionable for the reason that, regardless of how closely they are packed in the fiberscope end face assemblies, considerable lost (non-light-conductive or non-image-producing) space per unit area of the fiberscope end faces is inevitable. These fibers cannot be perfectly interfitted, i.e., in continuous side-by-side circumferential contact with one another and spaces therebetween result. The spaces are usually filled with the cement used to make the assembly.

Square or rectangularly shaped multifibers which, on the other hand, can be relatively tightly packed in substantially continuous side-by-side peripheral contact with each other, present expensive and troublesome problems in the manufacture of fiberscopes. These fibers cannot be tightly machine packed, i.e. as the fiber ribbons are wound, since slight variations in their cross-sectional sizes and shapes which usually unavoidably occur during drawing of the fiber either produce spacing between convolutions of the ribbon helix due to thinning of the fiber or overlays due to thickening or misshaping of the fiber when a machine controlled lead calculated to be equal to the intended width of the fiber is used to form the helix. An overlay, i.e. the result of one or more turns of a multifiber helix failing to seat against the winding drum and climbing over previous turns renders the ribbon useless.

In view of the foregoing, it has, heretofore, been the practice in machine winding rectangular fibers to use a lead slightly greater than the calculated width of multifiber so as to avoid the problem of overlays. This, then leaves spaces between the multifiber convolutions and requires that the convolutions be hand packed in the area of the ribbon to be cemented before cementing is effected as described above. With ribbons formed of multifibers as small as two thousandths of an inch or less in thickness, which is not at all an uncommon requirement, hand packing operations are not only extremely difficult and tedious to perform but they are eminently hazardous to the ribbons in that a fiber of that size is extremely delicate and breakage of only one fiber convolution will decrease the usefulness of the whole ribbon.

With the foregoing comments in mind, it can be seen that, heretofore, fiberscope manufacturers were faced with a choice of using a round or similarly shaped monofiber and accepting the result of lost or non-image-producing space in end faces of the resulting fiberscope or using a rectangular multifiber and being committed to the aforesaid hand packing operation. The first mentioned choice leaves the manufacturer with a somewhat inferior product with respect to the cosmetic appearance, i.e. powers of resolution or information, of images transferred thereby. The latter choice, on the other hand, usually results in enhanced cosmetic appearance of image but commits the manufacturer to the higher manufacturing cost of a hand operation, the hazard of fiber breakage and costly scrapping of ribbons, not to mention other problems which may become apparent hereinafter.

The present invention deals with the foregoing problems and disadvantages of the aforesaid prior art techniques and provides not only relief therefrom but an important and substantial improvement in end product result.

SUMMARY OF THE INVENTION

An object of this invention is to improve the packing density of fibers in fiberscopes and particularly to permit the desired packing density to be achieved by a machine operation rather than laborious hand packing. The improved packing density results in enhanced transmission, coherency, and cosmetic appearance (i.e. freedom from void areas) of images transmitted by fiberscope devices produced according to the present inventive concept.

In general, the present inventive concept involves the making of a multifiber of rhomboidal or a similar cross-sectional shape and winding this multifiber under complete control of a machine on a drum. A winding lead equal to or preferably slightly less than the width (i.e. length of one side) of the multifiber is used so as to form, automatically, a tightly packed helix or circular ribbon of one fiber thickness. Multilayer ribbons, not generally used, may be formed by similarly winding a number of helices of the fiber over the first, if desired. In the case of each helix, the rhomboidal multifiber is wound with one flat side thereof against or parallel to the drum moving along the drum surface in the direction of slope, toward the drum, of adjacent sides of the fiber. The term "lead" as used herein is intended to mean the axial advance, per revolution, of the multifiber along the drum.

Convolutions of the fiber ribbon thus formed are cemented or otherwise adhesively connected together across a transverse strip thereof and the ribbon is removed from the drum.

Several such ribbons are formed and assembled together with the aforesaid transverse strips thereof arranged in accurately superimposed and cemented together relationship with each other. Thereafter, all fiber convolutions are severed, preferably with a straight cut passing centrally through the area of cementing, to produce the fiberscope device wherein its opposite end faces are formed by the severance.

According to principles of this invention, dependable machine-controlled tight packing is made a reality by each convolution of the multifiber helix being caused to seat itself tightly against a side of its previous convolution by virtue of the slanted sides of the multifiber. One slanted side of each convolution engages and slides down or drops directly against the correspondingly slanted side of the previous convolution. With a winding lead slightly less than the average width of multifiber being used, tolerance for accidental lead variation or fiber size and shape variation is provided for.

Details of the present inventive concept will be more fully understood by reference to the following description and the accompanying drawing.

DESCRIPTION OF THE DRAWING

FIG. 7 is a perspective illustration of one of a number of helical multifiber ribbons produced according to the present inventive concept;

FIGS. 8, 9 and 10 illustrate a technique of forming an optical fiberscope device of said number of fiber ribbons; and FIG. 11 is a side elevational view of the fiberscope device.

DESCRIPTION OF THE PREFERRED EMBODIMENT

Figure 1:
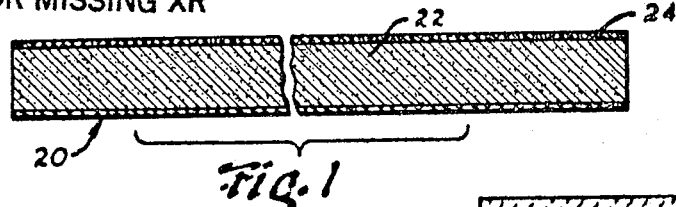
FIG. 1 illustrates, in enlarged longitudinal cross-section, an optical rod which is exemplary of a type contemplated for use in practice of the present inventive concept.

Referring now to the drawing, FIGS. 1 through 10 illustrate a sequence of operations used to form fiberscope F, FIG. 11, according to principles of the present invention wherein these operations begin with a supply of long and thin clad light-conducting rods of the type, or similar to that, illustrated in FIG. 1.

Rod 20, FIG. 1, is typical of the type of transilluminator commonly and widely used in the manufacture of fiber optical devices in general. Rod 20 comprises a core part 22 of a preselected index of refraction and relatively thin cladding 24 of a lower refractive index than that of core 22. While rod 20 may be formed of various plastic materials of optical quality, glasses are more widely used and have been found to produce superior transilluminators in the fiber optics field. Exemplary glasses for core 22 and cladding 24 of rod 20 are optical flint glass of 1.62 index of refraction and crown or soda lime glass of 1.52 index of refraction respectively. The thickness of cladding 24 is selected to be such that when rod 20 is drawn to final fiber size, the fiber cladding will be approximately one micron so as to prevent light being conducted by total internal refraction in one fiber from entering a neighboring fiber when a number of such fibers are bundled together. It is to be understood, however, that the aforementioned types of glasses and indices of refraction are given only for purposes of illustration with no intention of the present invention being limited thereby in any way whatever.

The manner in which light-conducting rods of the type illustrated in FIG. 1 are manufactured is immaterial to this invention and, accordingly, will not be dealt with herein. For those interested in such information, however, reference may be made to Pat. Nos. 2,037,241; 2,980,957 and 2,992,517.

Figure 2:
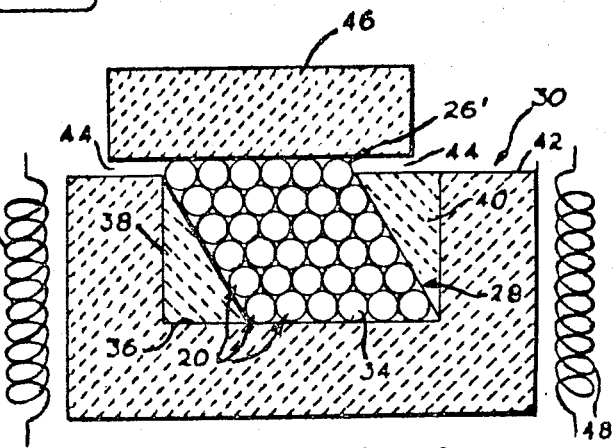
FIG. 2 is a transverse cross-sectional, generally diagrammatic, illustration of means and method of forming an assembly of a number of the aforementioned rods according to one aspect of this invention.

With a supply of, for example, thirty-six round rods 20 each approximately one-tenth of an inch in diameter and forty or so inches long (these dimensions being given for illustration only) a rhomboidal multifiber structure 26 (FIG. 3) is formed as follows:

A first row 28 (FIG. 2) of six rods, laid in parallel side-by-side relationship with each other, is formed in a support 30. A second row 32 of another six rods is placed over the first row 28 and so on, until the formation of the thirty-six rods shown in FIG. 2 is completed. Each successive row of rods is moved half a rod width to one side of its predecessor (e.g. to the left as viewed in FIG. 2) to form the rhomboidal cross-sectional configuration of assembly 26' as a whole. This arrangement additionally automatically produces maximum packing of rods 20 in view of the fact that all but those along one side and the bottom of the resulting assembly each drop in between and interfit with an adjoining pair of rods in a preceding row thereof.

Larger or smaller assemblies 26' may, of course, be formed by using respectively more or less rods 20 or by using rods of respectively larger or smaller diameter. In any case, however, the use of a number of rows of rods 20 equal to the number of rods in each row thereof and the fact that the rods are of circular cross-section, equal in size and interfitted as just described, inherently produces the illustrated cross-sectional configuration of a 120°, 60°, 120°, 60° rhombus.

In order to facilitate the building of assembly 26', support 30 is provided with channel 34 of a size and shape corresponding to that predicted of the assembly. A convenient method of forming channel 34 is illustrated in FIG. 2, wherein it can be seen that support 30 is first provided with a rectangular channel 36 having its opposite sides lined with filler pieces 38 and 40 each of a 30°, 60°, 90° triangular cross-sectional configuration, one of which is inverted relative to the other. The level of top 42 of support 30 is purposely disposed slightly below the anticipated height of assembly 26' (e.g. no less than half the thickness of one rod 20). This provides space 44 between cover 46 and top 42 when cover 46 is placed over assembly 26' without allowing any of rods 20 in the uppermost row thereof to become dislodged from their interfitted relationship with the preceding row. Thus, the weight of cover 46 against assembly 26' acts to compressively hold rods 20 in tightly interfitted relationship for fusion or cementing together in the final stage of forming structure 26 of assembly 26'.

Rods 20 in assembly 2' may be cemented together by impregnating the assembly from end-to-end with a removable bonding material or a cement such as cellulose nitrate in a solvent of nitromethane, or the equivalent, which can be subsequently burned away when structure 26 is heated and drawn to fiber size as will be described in detail hereinafter.

Other cementing techniques such as, for example, applying the bonding material to each rod 20 as assembly 26' is formed may, obviously, be used.

However, since there is some tendency for rods of cemented bundles not to fuse together into multifibers as well as may be desired in that they may attenuate individually and separate slightly during drawing, it is presently considered to be preferable to fuse rods 20 lightly or superficially together in assembly 26' and thus form a fused structure 26. This is accomplished by applying heat to support 30 with electrical heating coils 48 wherein, of course, support 30 and cover 46 are formed of a furnace refractory material. Actually, it is more common to place the entire support in an oven or fusing furnace according to the well known practice in similar fiber optical fusing operations which need no detailed description herein. One interested in these details, however, can find them in Pat. Nos. 2,992,516 and 3,188,188.

Figure 4:
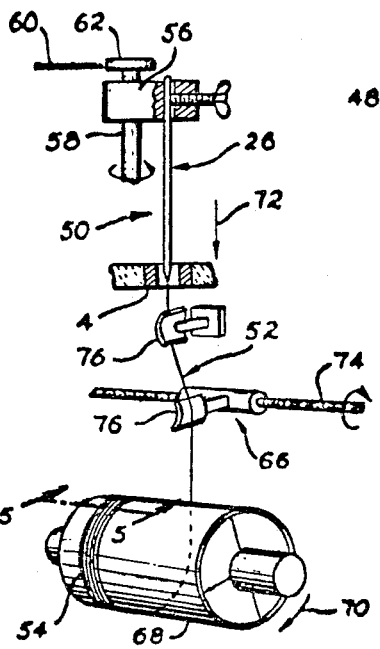
FIG. 4 diagrammatically illustrates an apparatus and method for making the aforesaid helical ribbon.
Figure 3:
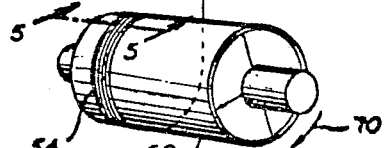
FIG. 3 is a fragmentary perspective illustration of a type of optical rod structure from which a multifiber is drawn and wound to form a helical ribbon.

In proceeding with the present inventive concept, reference is now made to FIG. 4, wherein it can be seen that structure 26, removed from support 30, is suspended vertically in fiber drawing apparatus 50 for the drawing therefrom and winding of rhombic multifiber 52 into ribbon 54 of hoop-like configuration.

Apparatus 50 being of the type conventionally used in the art of fiber and rod drawing is, accordingly, illustrated with a minimum of detail. This apparatus comprises clamping bracket 56 to which one end of structure 26 is secured and power drawn lead screw 58 by means of which structure 26 is lowered at a given rate. Belt 60 and pulley 62 are shown to illustrate means by which lead screw 58 may be driven, i.e. when belt 60 is connected to motivating means such as an electric motor, not shown. Structure 26 is lowered through heating ring 64, preferably of the electrically operated type, which heats the adjacent end of structure 26 to a fiber drawing viscosity. Multifiber 52 is baited and drawn from the heated end of structure 26, through level winding means 66, and attached to winding drum 68. Rotation of drum 68, as indicated by arrow 70, cooperatively with continuous slow lowering of structure 26, as indicated by arrow 72, effects the drawing of multifiber 52 and winding of helical ribbon 54. The pitch of the multifiber helix, ribbon 54, is controlled by simultaneous operation of lead screw 74 of level winding means 66. Pads 76 guide multifiber 52 along drum 68.

Greater details of the structure, operation and general principles involved in drawing and winding a fiber with the aforesaid type of apparatus may be had by reference to Pat. No. 2,037,241.

Figure 5:
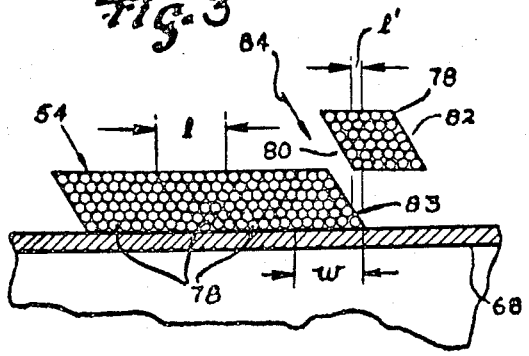
FIG. 5 is an enlarged cross-sectional view taken along a line such as line 5—5 in FIG. 4, wherein principles involved in the forming of said helical ribbon are illustrated.

In fiber drawing operations such as just described, the drawn multifiber will assume the geometrical cross-sectional shape of its host material, e.g. structure 26 in this case, thus multifiber 52 is rhombic as best illustrated in FIG. 5.

As such, multifiber 52 is guided by pads 76 which prevent twisting thereof and are so angled relative to the axis of drum 68 as to lay the multifiber flatly against the drum surface. In so doing, pads 76 lightly but intimately each engage one of the oppositely disposed slanted sides of multifiber 52. These pads are formed of a relatively soft resilient material such as felt or its equivalent whereby a minimum of frictional drag is applied to multifiber 52. Slight variations in the size of multifiber 52 will be compensated for by the resilience of the pads without undue tightening or loosening upon the multifiber. A lubricant of alcohol may be applied intermittently or continuously to pads 76 to reduce friction upon the multifiber and electrostatic charging thereof. Other lubricants used in the fiber optics industry for the above-stated purpose may be substituted for or added to the alcohol if desired.

In its employment of apparatus 50, or the equivalent, the present invention features, as it should now be apparent, the drawing and winding of a multifiber 52, of rhomboidal cross-sectional shape wherewith it is made possible to produce helical multifiber ribbons such as ribbon 54 which are automatically packed to maximum density under complete control of the machine according to the following particularities:

In winding multifiber 52 from left to right on drum 68, as viewed in FIG. 5, successively formed convolutions 78 of the multifiber helix of ribbon 54 are automatically machine packed tightly against one another. This machine packing is accomplished by operating the level winding means at a rate such that the pitch or lead 1 of the ribbon 54 helix is equal to or, preferably, slightly less by an amount 1' than the width $w$ of multifiber 52.

By virtue of the slanted sides 80 and 82 of multifiber 52, each convolution 78 formed by using lead 1 minus 1' will (FIG. 5), as it is progressively formed, move toward drum 68 until side 80 engages side 83 of its preceding convolution and then move generally in the direction of arrow 84 against drum 68. In the case of a slight irregularity in the shape or size of multifiber 52 happening to increase its width $w$ slightly, more movement in the direction of arrow 84 will take place but with the same net result of the multifiber tending to seat against drum 68. Conversely, where the slight irregularity may decrease width $w$, less or even no movement in the direction of arrow 84 may take place but with the desired tight packing of the convolution relative to its predecessor still effected.

With lead 1 minus 1', i.e. slightly less than the average width $w$ of multifiber 52, no spaces between convolutions 78 are permitted to occur. However, should an unusual thickening in multifiber 52 occur to the extent of binding one convolution so tightly against another as to induce slight tilting of the one or more convolutions, that is not catastrophic since, even as such, the resulting ribbon 54 is usable.

Figure 6:
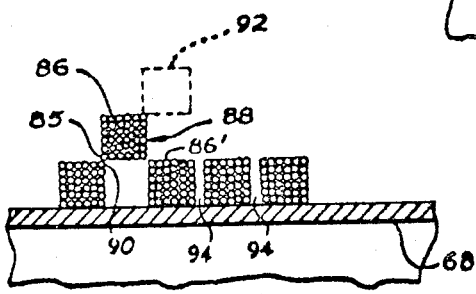
FIG. 6 is a view similar to FIG. 5, wherein problems of prior art practices in the field of this invention are illustrated to clearly demonstrate, by comparison with FIG. 5, the distinctiveness, novelty and advantages of the present invention over the prior art.

In order to clearly demonstrate the improvement afforded by the present inventive concept over, for example, the prior art practice of using a rectangular multifiber in machine winding a ribbon such as 54, FIG. 6 illustrates the catastrophic result of one sharp corner 85 of an oversized convolution 86 of a rectangular multifiber 88 catching upon another sharp corner 90 of its previous convolution and causing a pile-up or overlay to occur which renders the ribbon useless. This type of overlay may build up to several multifiber thicknesses as indicated by dot-dash lines 92 or it may happen that the next convolution 86' will drop down against the winding drum. In either case, the overlay or overlays, as the case may be, either cannot be pushed into place for lack of space or if pushed into place, their larger diametral size may cause adjacent convolutions to loosen on the drum and become intertwined or otherwise fouled wherein the ribbon is usually rendered useless. This is all without mentioning the hazard of fiber breakage during such handling.

Ribbons formed of prior art rectangular multifibers are, as further demonstrated in FIG. 6, also subject to having spaces 94 between their convolutions due to slight thinning of the multifiber which, as already mentioned, imposes upon the manufacturer the requirement for hand packing each ribbon after winding thereof. Furthermore, if it is attempted to entirely avoid overlays by using a winding lead fully adequate to prevent such, the size of spacings 94 is relatively substantially increased and hand packing operations must be used. These operations tend to cause loosening of the ribbon convolutions on the drums, rolling of the fiber and other misalignment problems such as the pushing of one convolution beneath another, all with the ever present danger of causing fiber breakage.

It is to be understood that FIG. 6 does not illustrate a part of this invention. It is presented only to demonstrate with the greatest clarity possible the distinctiveness, novelty and advantages of the present system (FIGS. 1-5) over the prior art.

In referring now to the utilitarian value of multifiber ribbons produced according to the present inventive concept, attention is directed more particularly to FIGS. 4 and 7-10, wherein a technique for forming fiberscope F (FIG. 11) of a plurality of multifiber ribbons 54 is illustrated.

Convolutions of the above-described tightly machine packed ribbon 54 (FIG. 4) are cemented together across a transverse strip 96 (see FIG. 7) while still on drum 68. The ribbon is then removed from the drum whereupon it appears generally as illustrated in FIG. 7.

Several of such ribbons are produced either one at a time on drum 68 or in spaced succession along the length of the drum. After cementing and removal from the drum, the ribbons are stacked, one within or one over another, with the cemented strips 96 thereof in accurately superimposed relationship with each other. This stacking of strips 96 is effected preferably in a rectangularly U-shaped open-ended fixture 98, a longitudinal cross-section of which is shown in FIG. 8. Channel 100 in fixture 98 is of a width equal to that of one ribbon width (e.g. six multifiber thicknesses in the presently illustrated example) so that accurate superpositioning of the multifibers throughout their cemented lengths automatically takes place with the positioning of the said lengths in fixture 98.

For the purpose of breaking up continuity in helix direction of successively stacked ribbons in fixture 98, alternate ribbons thereof may be reversed or turned 180° to produce a herringbone pattern of the cemented together slanted sides of the rhombic multifibers throughout a cross-section of the stack. From experience in the art of making fiber optic image-conducting devices, it has been found that irregularly but geometrically identically patterned multifiber mosaics produce better image receiving and transmitting faces, i.e. with respect to the cosmetic appearance of image, than do regularly patterned multifiber mosaics.

Ribbons 54 may be stacked in fixture 98 with the directions of their helices all the same if desired. This, too, will produce a broken pattern of the cross-sectional multifiber mosaic since each multifiber ribbon of the stack will be displaced to one side of its preceding ribbon.

Strips 96 (FIG. 7) may be formed each of a permanent bonding material with a connecting layer of the same or a similar material placed between each of ribbons 54 in fixture 98 (FIG. 8) so that. with pressure applied to the stack, tight cementing together of the ribbons will result.

Alternatively, and preferably, however, an epoxy resin of the two stage curing type may be used. This type of epoxy is well known in the art and is commonly referred to as "B-stage" epoxy. It contains a solvent adapted to dry at normal room temperature when first applied, e.g. to the ribbon on winding drum 68, and becomes tacky and fusible followed by permanent hardening when polymerized or cured with heat in the order of 250° F. applied thereto.

Thus, with strips 96 (FIG. 7) formed of a two-stage epoxy, the need for a second connecting cement in fixture 98 (FIG. 8) is eliminated with the advantage of there being a minimum of cement in the final assembly. Polymerization or second stage curing of the epoxy is contemplated as being done directly in fixture 98 by applying heat to the fixture with, for example, electrical heating coils 102. Heated cover member 104 of appreciable weight is placed upon the stack of ribbons 54 to produce a tight bond between ribbons 54. Pressure may also be applied to cover 104 in the direction of arrow 106, if desired or required.

Upon completion of the stacking and cementing operations performed in fixture 98 (FIG. 8) the assembly 108 of ribbons 54 is removed from the fixture and severed through a plane represented by line 110 (FIG. 9) which extends transversely substantially centrally through the cemented length of the assembly. Cutting assembly 108 in the plane of line 110 forms fiberscope F (FIG. 11) having geometrically identical opposite end faces 112 and 114 when the cut assembly is extended. One such face 112, greatly enlarged, is shown in FIG. 10 wherein the arrangement of basic rods 20, now fibers 20' resulting from the drawing of multifibers 52, and also the tight interfitting relationship of multifibers 52 can be clearly envisioned. In particular, it will be noted that fibers 20' of multifiber 52 are substantially tightly interfitted with each other one between each surrounding pair thereof throughout the cross-section of each multifiber end and also along lines of adjoinment or connection of opposite sloping sides of the rhomboidal multifiber ends.

Sides of assembly 108 adjacent to faces 112 and 114 may be ground away along lines 116 in the event that it is desired to render these faces perfectly rectangular.

It should be understood that the processing steps which follow formation of the machine packed ribbons 54 (i.e. from FIG. 7 through to FIG. 11) may be varied according to the artisan's desire. The cement or cements used to form strips 96 and connection between ribbons 54 in fixture 98 may be a removable type such as cellulose nitrate in a solvent of nitromethane or the equivalent and, instead of heat curing of the cement in fixture 98, it may be burned away with heat of sufficient intensity to fuse all multifibers 52 together thus forming a fused rather than cemented section which may be severed as shown in FIG. 9.

Details of the latter procedure may be had by referring to Pat. No. 3,215,029. Also, reference may be made to Pat. Nos. 3,033,731 and 3,104,191 for other details of the first mentioned technique of forming cemented fiberscopes of multifiber ribbons.

It is further pointed out that the system of FIG. 2 using support 30 for forming the fused rhombic structure 26 may, if desired, be replaced by a system wherein rods 20 of assembly 26' are guided longitudinally progressively into a tight fitting relationship of the same rhombic configuration as is illustrated in FIG. 2 and immediately drawn to fiber size. This system for forming fibers of desired rectilinear cross-sectional configurations without cementing or prefusing operations, is disclosed in Pat. No. 3,193,363. A technique of clamping rods 20 together and drawing the bundle to effect fusion with attenuation may also be used. Details of this concept may be had by reference to Pat. No. 3,119,678.

It should now be apparent that a principal and important feature of this invention is that of making possible the production of tightly formed ribbons of optical fibers by machine packing rather than laborious hand packing with the advantages of improving end product quality and substantially reducing manufacturing time, scrap and cost.

What is claimed is:

1. The method of making a tightly packed helical ribbon of one optical multifiber thickness comprising the steps of:
    drawing the multifiber from one end of an elongated bundle of a plurality of juxtaposed rods, said bundle having an outer rhomboidal cross-sectional shape with flat sides, two of which slope acutely toward a third side and said multifiber having substantially the same cross-sectional shape as that of said bundle;
    winding said multifiber into a cylindrical helix having a number of juxtaposed convolutions of a preselected circumferential dimension with said third flat side of said multifiber continuously disposed inwardly of said cylindrical helix; and
    causing said winding of said multifiber to progress gradually in a direction parallel to said third flat side with a pitch no greater than the width of said third flat side during the forming of each convolution and in the general direction of slope of said two sides of said multifiber which are adjacent to said third flat side whereby intimate side-by-side packing of said convolutions is accomplished.

2. The method according to claim 1 wherein said distance of leading of said multifiber during the forming of each of said convolutions is less than the width of said one flat side of said multifiber.

3. The method according to claim 1 further including the step of adhesively securing said convolutions together along a strip of substantial width extending across said ribbon.

References Cited

UNITED STATES PATENTS

| | | | |
|---|---|---|---|
| 3,033,731 | 5/1962 | Cole | 65—DIG 7 |
| 3,216,807 | 11/1965 | Woodcock | 65—4 |
| 3,397,022 | 8/1968 | Cole | 65—4 X |
| 3,427,958 | 2/1969 | Glasson | 65—DIG 7 |
| 3,567,549 | 3/1971 | Hoffmeister et al. | 65—4 |
| 3,544,406 | 12/1970 | McAllister | 65—DIG 7 |
| 3,586,563 | 6/1971 | Fukami et al. | 65—DIG 7 |

FRANK W. MIGA, Primary Examiner

U.S. Cl. X.R.

65—3, DIG 7, 121